(12) United States Patent
Sun et al.

(10) Patent No.: US 9,992,001 B2
(45) Date of Patent: Jun. 5, 2018

(54) INTERFERENCE MEASUREMENT PILOT TONES

(71) Applicant: Marvell World Trade Ltd., St. Michael (BB)

(72) Inventors: Yakun Sun, Sunnyvale, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 100 days.

(21) Appl. No.: 15/004,840

(22) Filed: Jan. 22, 2016

(65) Prior Publication Data

US 2016/0233998 A1 Aug. 11, 2016

Related U.S. Application Data

(60) Provisional application No. 62/115,051, filed on Feb. 11, 2015.

(51) Int. Cl.
*H04L 5/00* (2006.01)
*H04W 72/08* (2009.01)
(Continued)

(52) U.S. Cl.
CPC ......... *H04L 5/0051* (2013.01); *H04B 17/336* (2015.01); *H04B 17/345* (2015.01);
(Continued)

(58) Field of Classification Search
None
See application file for complete search history.

(56) References Cited

U.S. PATENT DOCUMENTS

2004/0166886 A1\* 8/2004 Laroia ................. H04B 7/0491
455/522
2007/0280394 A1\* 12/2007 Fung ................... H04L 27/2613
375/362

(Continued)

OTHER PUBLICATIONS

International Application No. PCT/IB2016/050345, Notification of Transmittal of The International Search Report and the Written Opinion of the International Searching Authority, dated May 9, 2016, 18 pages.

*Primary Examiner* — Hassan Phillips
*Assistant Examiner* — Ayanah George

(57) ABSTRACT

The present disclosure includes systems and techniques relating to interference measurement pilot tones in communication systems. In some implementations, a method includes identifying, by a transmitting device, a pilot pattern for transmission in a plurality of orthogonal frequency-division multiplexing (OFDM) symbols over a wireless local area network (WLAN) channel, the pilot pattern including an interference measurement pilot tone, wherein the interference measurement pilot tone is located at a specified frequency and time location in the plurality of OFDM symbols, the interference measurement pilot tone including a null tone that facilitates a receiving device to measure interference; and transmitting, by the transmitting device, the pilot pattern in the plurality of OFDM symbols over the WLAN channel. The pilot pattern can further include a regular, nonzero pilot tone that facilitates the receiving device to measure a frequency drift or a phase noise.

18 Claims, 6 Drawing Sheets

(51) Int. Cl.
  *H04B 17/336*   (2015.01)
  *H04B 17/345*   (2015.01)
  *H04W 52/34*    (2009.01)
  *H04L 27/26*    (2006.01)
  *H04W 84/12*    (2009.01)
  *H04W 52/24*    (2009.01)

(52) U.S. Cl.
  CPC ............ *H04L 5/005* (2013.01); *H04L 5/0007* (2013.01); *H04L 5/0073* (2013.01); *H04W 52/346* (2013.01); *H04W 72/082* (2013.01); *H04L 5/0048* (2013.01); *H04L 27/2601* (2013.01); *H04W 52/243* (2013.01); *H04W 84/12* (2013.01)

(56) References Cited

U.S. PATENT DOCUMENTS

| | | | |
|---|---|---|---|
| 2009/0016456 A1 | 1/2009 | Li | |
| 2009/0213950 A1* | 8/2009 | Gorokhov | H04B 1/715 375/260 |
| 2009/0310707 A1* | 12/2009 | Cheng | H04L 1/0041 375/298 |
| 2010/0329374 A1 | 12/2010 | Pi | |
| 2012/0224659 A1* | 9/2012 | Yu | H04L 5/0048 375/340 |
| 2014/0307576 A1 | 10/2014 | Nagata | |
| 2015/0078354 A1* | 3/2015 | Chen | H04W 72/0486 370/336 |

\* cited by examiner

500

Identify a pilot pattern that includes an interference measurement tone for transmission in one or more OFDM symbols over a WLAN channel — 510

Adjust power of an OFDM symbol that includes the interference measurement pilot tone — 520

Transmit the pilot pattern in the OFDM symbols over the WLAN channel — 530

FIG. 5

INTERFERENCE MEASUREMENT PILOT TONES

CROSS REFERENCE TO RELATED APPLICATIONS

This application claims the benefit of the priority of U.S. Provisional Application Ser. No. 62/115,051, filed Feb. 11, 2015 and entitled "Interference Measurement Tones for OFDMA-WiFi," which is hereby incorporated by reference in its entirety.

BACKGROUND

The present disclosure describes systems and techniques relating to pilot tones used in communication systems.

Orthogonal frequency division modulation (OFDM) is a modulation technique for communications which splits a data stream into multiple data substreams. Such data substreams are sent over different OFDM subcarriers, which can be referred to as frequency tones or simply tones.

Wireless networks can use OFDM to transmit and receive signals. Examples of OFDM-based systems include wireless local area networks (WLANs, e.g., WiFi networks) such as those defined in the Institute of Electrical and Electronics Engineers (IEEE) wireless communications standards, e.g., IEEE 802.11a, IEEE 802.11g, IEEE 802.11n, IEEE 802.11ac. Some wireless networks use a single-in-single-out (SISO) communication approach, where each wireless communication device uses a single antenna. Other wireless networks use a multiple-in-multiple-out (MIMO) communication approach, where a wireless communication device uses multiple transmit antennas and multiple receive antennas. WLANs, such as ones based on the IEEE 802.11n or IEEE 802.11ac standards, can use OFDM and MIMO.

SUMMARY

The present disclosure includes systems and techniques relating to interference measurement pilot tones. According to an aspect of the described systems and techniques, a device includes a processor and a transmitter. The processor, when executing computer-readable instructions, causes the device to identify a first pilot pattern for transmission in a plurality of orthogonal frequency-division multiplexing (OFDM) symbols over a wireless local area network (WLAN) channel, the first pilot pattern including a plurality of regular, non-zero pilot tones; and generate a second pilot pattern including an interference measurement pilot tone by puncturing a regular, non-zero pilot tone at a specified frequency and time location in the first pilot pattern, the interference measurement pilot tone facilitating a receiving device to measure interference. The transmitter is configured to transmit the second pilot pattern in the plurality of OFDM symbols over the WLAN channel. Implementations of this aspect can include one or more of the following features. In some implementations, the processor is programmed with computer-readable instructions that, when run, cause the device to adjust a power of an OFDM symbol that includes the interference measurement pilot tone to keep a same average power per OFDM symbol or a same average power per tone across the plurality of OFDM symbols.

In some implementations, the second pilot pattern includes only interference measurement pilot tones and no regular, nonzero pilot tones in the plurality of OFDM symbols; or one or more interference measurement pilot tones in a first number of OFDM symbols out of the plurality of OFDM symbols and one or more regular, nonzero pilot tones in remaining OFDM symbols of the plurality of OFDM symbols; or one or more interference measurement pilot tones and one or more regular, nonzero pilot tones interleaved in the plurality of OFDM symbols.

In some implementations, the second pilot pattern is a function of an identifier of the transmitter or the receiving device, and wherein the function prevents collision of the interference measurement pilot tone with interference measurement pilot tones of other transmitting devices. In some implementations, the second pilot pattern is a function of a location of an allocated wireless channel resource of the receiving device relative to a boundary of the WLAN channel.

According to another aspect of the described systems and techniques, a method includes identifying, by a transmitting device, a pilot pattern for transmission in a plurality of orthogonal frequency-division multiplexing (OFDM) symbols over a wireless local area network (WLAN) channel, the pilot pattern including an interference measurement pilot tone, wherein the interference measurement pilot tone is located at a specified frequency and time location in the plurality of OFDM symbols, the interference measurement pilot tone including a null tone that facilitates a receiving device to measure interference; and transmitting, by the transmitting device, the pilot pattern in the plurality of OFDM symbols over the WLAN channel.

Implementations of this aspect can include one or more of the following features. In some implementations, the pilot pattern further includes a regular, nonzero pilot tone that facilitates the receiving device to measure a frequency drift or a phase noise. In some implementations, the pilot pattern is transmitted in one or more signal fields (SIGs) of the plurality of OFDM symbols.

In some implementations, the method further includes adjusting, by the transmitting device, a power of an OFDM symbol that includes the interference measurement pilot tone to keep a same average power per OFDM symbol or a same average power per tone across the plurality of OFDM symbols.

In some implementations, the pilot pattern includes only interference measurement pilot tones and no regular, non-zero pilot tones in the plurality of OFDM symbols; or one or more interference measurement pilot tones in a first number of OFDM symbols out of the plurality of OFDM symbols and one or more regular, nonzero pilot tones in remaining OFDM symbols of the plurality of OFDM symbols; or one or more interference measurement pilot tones and one or more regular, nonzero pilot tones interleaved in the plurality of OFDM symbols.

In some implementations, the pilot pattern is a function of an identifier of the transmitting device or the receiving device, and wherein the function prevents collision of the interference measurement pilot tone with interference measurement pilot tones of other transmitting devices. In some implementations, the pilot pattern is a function of a location of an allocated wireless channel resource of the receiving device relative to a boundary of the WLAN channel.

In some implementations, the receiving device is a first receiving device and the pilot pattern is a first pilot pattern, the method further including allocating, by the transmitting device, a first wireless channel resource to the first receiving device, wherein the first wireless channel resource is adjacent to or on a boundary of the WLAN channel; allocating, by the transmitting device, a second wireless channel resource to a second receiving device, wherein the second wireless channel resource is away from the boundary of the WLAN channel; identifying, by the transmitting device, a second pilot pattern for the second receiving device for transmission in the plurality of OFDM symbols over the WLAN channel, wherein the first pilot pattern includes more interference measurement pilot tones than the second pilot pattern; and transmitting, by the transmitting device, the second pilot pattern in the plurality of OFDM symbols over the WLAN channel.

In some implementations, the WLAN channel is a first WLAN channel and the pilot pattern is a first pilot pattern, the method further including identifying, by the transmitting device, a second pilot pattern for transmission in a second plurality of OFDM symbols over a second WLAN channel, and transmitting, by the transmitting device, the second pilot pattern in the second plurality of OFDM symbols over the second WLAN channel. In some implementations, the second WLAN channel is a primary channel and the first WLAN channel is a secondary channel; and the first pilot pattern includes more interference measurement pilot tones than the second pilot pattern.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The disclosed technologies can result in one or more of the following potential advantages. The described systems and techniques can provide flexibility in pilot pattern designs and result in more accurate measurements of interferences in a communication system, more efficient utilization of the transmission power, more effective post-processing of received signals that are transmitted over multiple WLAN channels, and more reliable signal reception and detection.

Details of one or more implementations are set forth in the accompanying drawings and the description below. Other features and advantages may be apparent from the description and drawings, and from the claims.

DRAWING DESCRIPTIONS

FIG. 5 is a flowchart showing an example of a process of implementing interference measurement pilot tones for transmission in a communication system.

DETAILED DESCRIPTION

Figure 1:
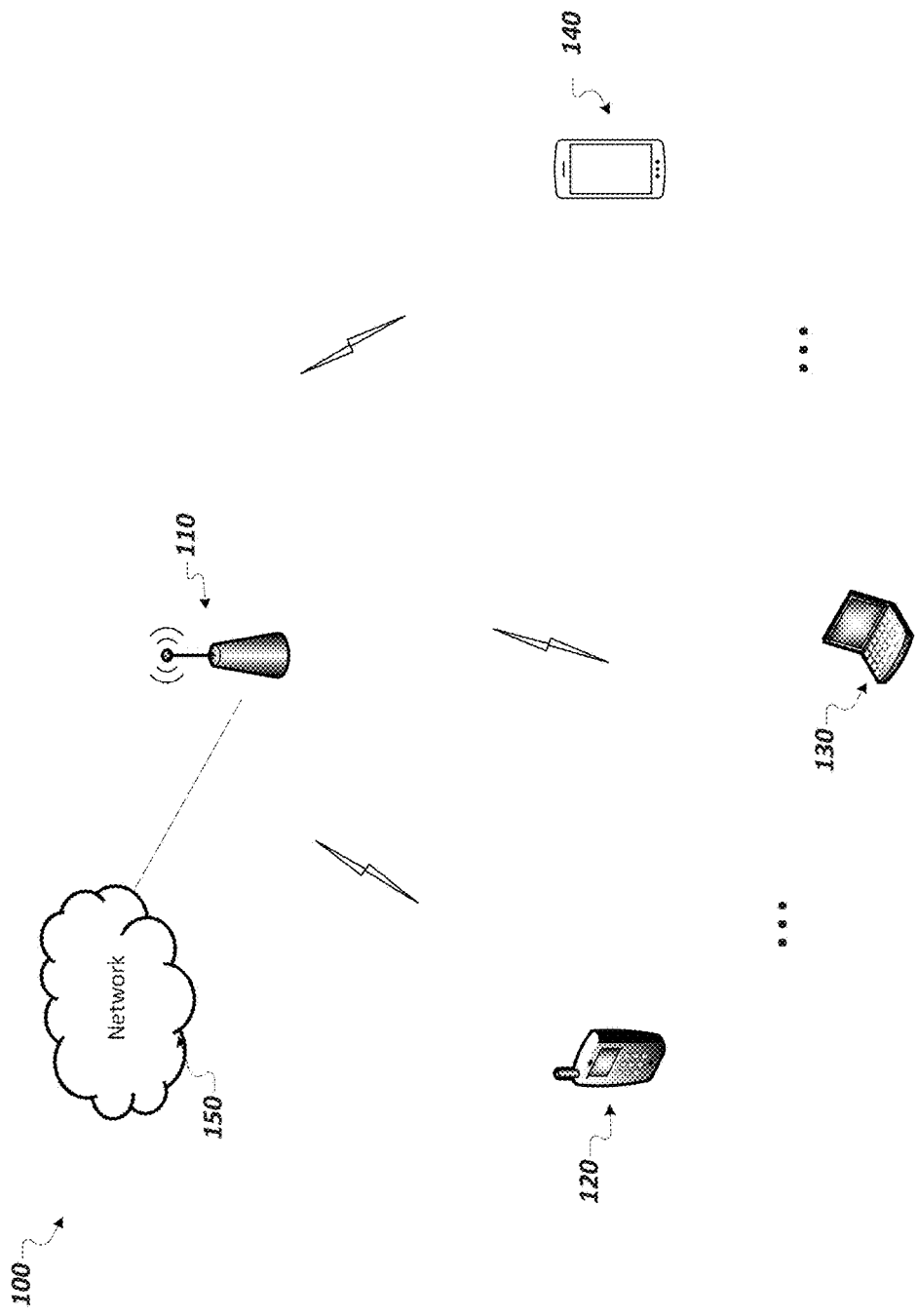
FIG. 1 is a block diagram showing an example of a communication system.

The systems and techniques described herein can be implemented as one or more devices, such as one or more integrated circuit (IC) devices, in a communication device (e.g., a wireless communication device, a wireline communication device, an electronic data storage device, a channel medium access access/control device). For example, the systems and techniques disclosed can be implemented in a wireless local area network (WLAN) transceiver device (e.g., a WLAN chipset) suitable for use in an OFDM MIMO system.

In some implementations, a WLAN or WiFi system (e.g., high density network IEEE 802.11ax, High Efficiency WLAN (HEW) system) can allow multiple users to access the communication channel based on orthogonal frequency-division multiple access (OFDMA). OFDMA is a multi-user version of OFDM digital modulation scheme. Multiple access can be achieved in OFDMA by assigning subsets of subcarriers or tones to individual users. This allows simultaneous transmission among several users. OFDMA has been considered as an effective technique to boost system throughput and network capacity.

WLAN can transmit wireless signals over different frequency ranges or bands (e.g., 2.4 GHz, 3.6 GHz, 4.9 GHz, 5 GHz, and 5.9 GHz bands). In some implementations, each range is divided into a multitude of channels. The multiple WLAN channels can be overlapping or non-overlapping. For example, IEEE 802.11g/n uses a channel bandwidth of 20 MHz.

In some implementations, OFDMA signals for an intended receiver may be transmitted over the boundary of one or more WLAN channels. For example, a wireless station (STA) can be scheduled with a number of tones in two or more 20 MHz WLAN channels. Another example is signal fields (SIGs) transmission over some or all 20 MHz WLAN channels for diversity and combining gain. SIGs are used to signal fundamental physical layer (PHY) parameters for a receiver to demodulate and decode the data field. For non-High Throughput (HT) (e.g., IEEE 802.11a/g) physical layer convergence protocol data unit (PPDU), a 4 μs SIG field is transmitted immediately before the data field; in a HT (e.g., IEEE 802.11n)/Very High Throughput (VHT) (e.g., IEEE 802.11ac) PPDU, both a 4 μs legacy SIG (L-SIG), and a new 8 μs HT/VHT-SIG is transmitted after L-SIG, and the transmission is duplicated over multiple 20 MHz channels; in a High Efficiency (HE) PPDU (802.11ax), multiple SIG fields (e.g., L-SIG, R-L-SIG, HE-SIG-A, HE-SIG-B) are present before the data field. In some instances, given the contention-based channel access for WLAN, interference may severely degrade the diversity transmission performance.

This disclosure proposes interference measurement pilot tones for more accurate estimation of the interference, for example, for OFDMA-based WLAN systems (also referred to as OFDMA-WLAN or OFDMA-WiFi). Unlike non-zero pilot tones, such as those used in legacy systems and used for phase tracking, Doppler tracking, etc., an interference measurement pilot tone includes a null tone. The interference measurement pilot tone is intentionally left blank for interference measurements. For instance, instead of transmitting non-zero pilot tones (referred to as regular pilot tones), a transmitter can leave tones or subcarriers blank at certain frequency and time locations. The null tones can effectively measure interferences that the signal experienced during the transmission and reception. A receiver (e.g., an STA) can utilize interference measurement pilot tones to estimate the interferences.

Based on the measured interference, strategic post-processing of the received signals can be performed. For example, the measured interference can help determine channel conditions of one or more WiFi channels. The received signal can be scaled and combined based on the measured interference level to achieve an optimal or otherwise desired diversity gain. As another example, if the measured interference indicates that the underlying channel suffers severe interferences, the signal received from the channel can be disregarded, rather than being combined with signals received from other channels, which avoids the severe interference on the channel polluting the received signals from other channels.

FIG. 1 is a block diagram showing an example of a communication system 100. The communication system 100 can represent a WLAN system, a cellular system, a satellite communication system, a near-field communication system, a machine-to-machine communication system, or other type of communication system. As an example, the system 100 can be a WiFi system that uses interference measurement pilot tones for OFDMA.

The communication system 100 can include multiple wireless communication devices 110, 120, 130, 140 that communicate over one or more wireless channels. For example, when operating in an infrastructure mode, a wireless communication device 110 can represent an access point (AP) that provides connectivity with a network 150, such as the Internet, to other wireless communication devices 120, 130, and 140, e.g., client stations, access terminals (AT), or wireless stations (STAs). For instance, the wireless communication device 110 can allow multiple access of the wireless communication devices 120, 130, and 140 based on OFDMA. The wireless communication device 110 can allocate wireless channel resources (e.g., in terms of frequency tones of one or more OFDM symbols) to the wireless communication devices 120, 130, and 140 for communications over one or more WLAN channels.

Various examples of the wireless communication devices include mobile phones, smart phones, wireless routers, wireless hubs, etc. In some cases, wireless communication electronics are integrated with data processing equipment such as laptops, personal digital assistants, and computers.

In some implementations, the communication system 100 can perform wideband SIG transmission for high efficiency (HE) WiFi. Given the overhead of OFDMA resource allocation and user configuration, some HE-SIG fields can be considered to be transmitted over multiple WLAN channels (e.g., 20 MHz), if the overall bandwidth (BW) of the PPDU is larger than 20 MHz. For example, the overall BW of the PPDU can be dedicated to multiple STAs in a downlink (DL)-OFDMA transmission. The same HE-SIG fields can be duplicated over each 20 MHz. In these cases, combining all copies from each channel can improve the reliability or reduce the number of symbols required for SIG. In another example, the HE-SIG can be coded over a wider (than 20 MHz) BW (with or without repetition). A joint decoding over the full BW may achieve the same reliability improvement or overhead reduction goals.

In some instances, the interference of each WLAN channel may not be similar, for example, due to hidden node and other consequences of WLAN channel access mechanism. As a result, the interference on each of the channels can be frequency/channel-selective, requiring different scaling of the signals from the respective channels for optimal performance. The implementations of the interference measurement tones allow more accurate estimation of the interference on each channel and thus facilitate effective scaling of the received signal for constructive combination of the received signals over multiple channels.

In some implementations, the communication system 100 can be configured to perform narrowband OFDMA resource allocation. For example, the wireless communication device 110, serving as an AP, may schedule an STA (e.g., the wireless communication device 120, 130, or 140) over a portion of frequency spectrum. In some instances, the scheduled part of frequency is not necessarily contained in one WLAN channel. Encoding and decoding of the signal for the STA are therefore performed over multiple WLAN channels. In some instances, the hidden node and other issues can also result in a frequency/channel selective interference. Similarly, by using the interference measurement tones, the STA can estimate the interference on each of its allocated WLAN channels and thus scale the received signal from each channel accordingly to obtain optimal or otherwise desired performance. In some instances, if one channel is heavily interfered, it might be better to discard rather than combine the received SIG signal within this channel with SIG signals in other channels.

Figure 2:
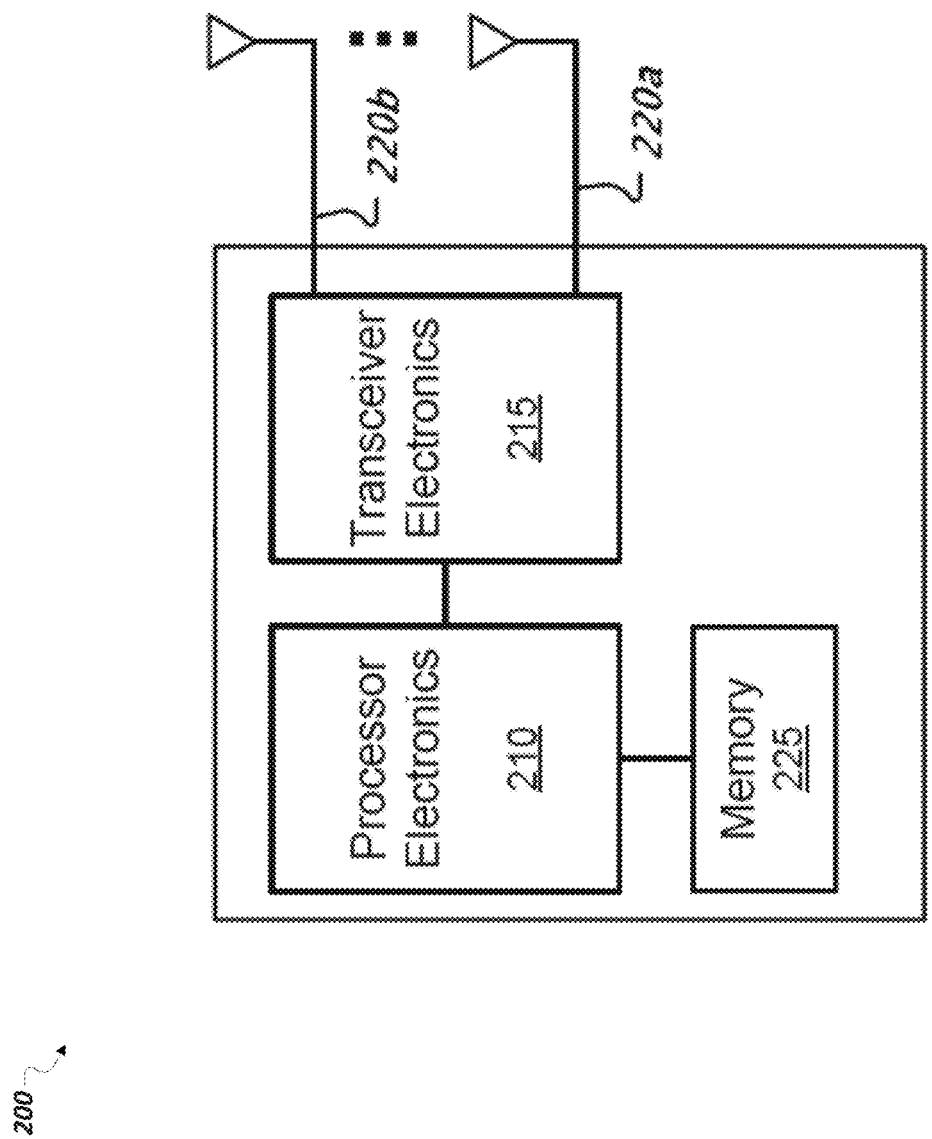
FIG. 2 shows a simplified block diagram of an example of a wireless communication device.

FIG. 2 shows a simplified block diagram of an example of a wireless communication device 200. Various examples of device 200 include an access point (AP), a base station (BS), an access terminal (AT), a client station, or a mobile station (MS). For example, the device 200 can represent one or more of the wireless communication devices 110, 120, 130, 140 in FIG. 1 or another device.

The device 200 can include processor electronics 210 such as one or more processors that implement methods effecting the techniques presented in this disclosure. The processor electronics 210 can be operable to execute computer-readable instructions that, when executed on the processor electronics 210, cause the device 200 to implement methods effecting the techniques presented in this disclosure. For example, the processor electronics 210 can cause the device 200 to generate pilot patterns that include one or more interference measurement pilot tones, regular pilot tones, or a combination of them. The pilot tones, regardless of the type, can be placed in SIG or other fields of one or more OFDM symbols.

The device 200 includes transceiver electronics 215 (e.g., a transmitter, receiver, or transceiver) to send and/or receive wireless signals over one or more antennas 220a-220b. In some implementations, transceiver electronics 215 can include multiple radio units. In some implementations, a radio unit includes a baseband unit (BBU) and a radio frequency unit (RFU) to transmit and receive signals. In some implementations, the device 200 includes dedicated circuitry for transmitting (e.g., a dedicated transmitter) and dedicated circuitry for receiving (e.g., a dedicated receiver). In some implementations, transceiver electronics 215 can transmit and receive pilot patterns that include interference measurement pilot tones in OFDM symbols over one or more WLAN channels.

The device 200 can include one or more memories 225 configured to store information such as data and/or instructions (e.g., computer-readable instructions that cause the device 200 to implement methods effecting the techniques presented in this disclosure).

In some communication systems (e.g., WLAN systems), data interleaving and tone mapping are performed regardless of pilot tones. For instance, no matter whether pilot tones are transmitted or not, the data is processed over the virtual tone indices after removing pilot tones (and guard/DC tones) in the BW. In other words, data and pilots need not be multiplexed.

In some implementations, pilots are transmitted for every OFDM symbol. For example, WLAN typically works in low Doppler spread channels, carrier frequency offset (CFO) drift or phase noise leads to a slowly changing phase. As such, the transmission of pilots for every OFDM symbol can be redundant. Thus, in some implementations, pilots are not transmitted for every OFDM symbol.

In some implementations, new pilot patterns can be designed for OFDMA-WLAN systems such that the pilot patterns include interference measurement pilot tones. A pilot pattern can include specified placements or locations of the regular pilot tones, interference measurement pilot tones, or both over one or more OFDM symbols. In some implementations, the locations of the interference measurement pilot tones can be designed, for example, to reduce overhead, to provide accurate estimations of the interferences without sacrificing estimation accuracy of the CFO drift or phase noise, or to achieve other purposes. In some implementations, only one of the two types of pilot tones is chosen for a specified pilot tone location.

In some implementations, a pilot pattern with the interference measurement pilot tones (referred to as an interference measurement pilot pattern) can be obtained by puncturing a pilot pattern that includes only regular pilot tones (referred to as an interference measurement pilot pattern). For example, the regular pilot pattern can be a pilot pattern for an existing WiFi system. The interference measurement pilot pattern can be obtained, for example, by leaving certain regular pilot tones unused in the regular pilot pattern.

Figure 3:
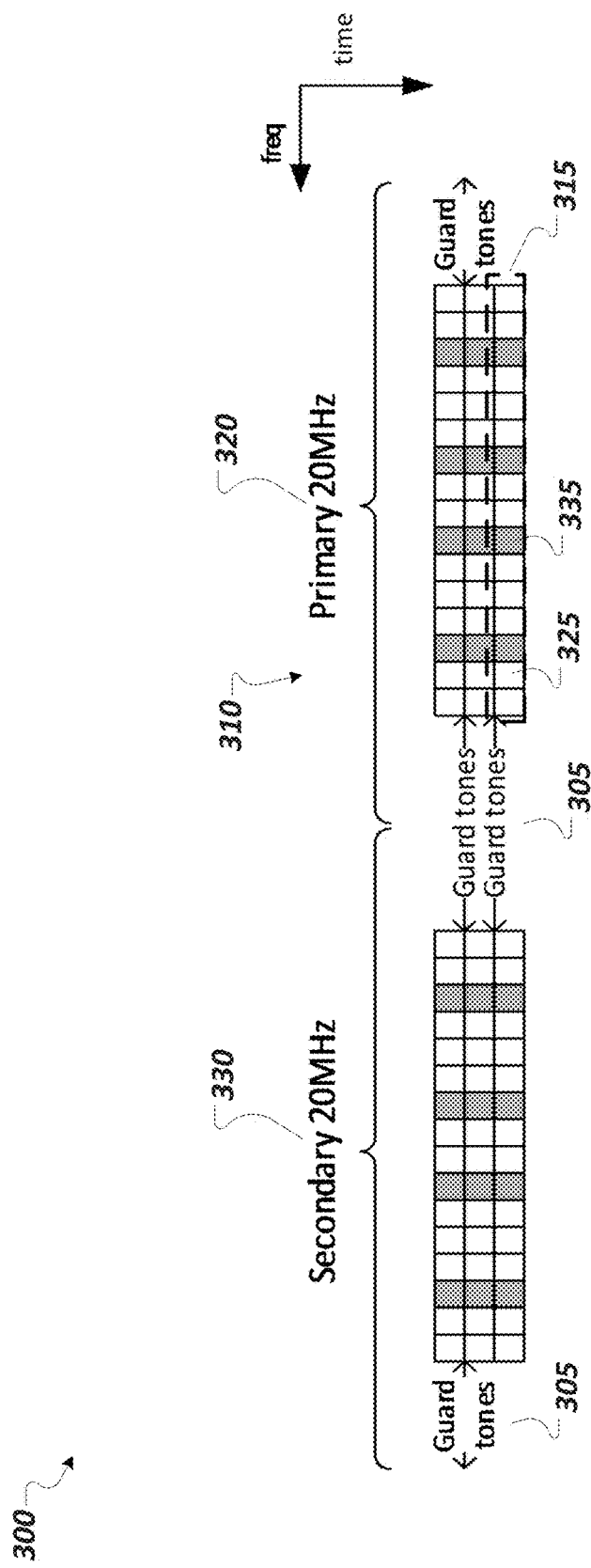
FIG. 3 shows an example of a pilot pattern for signal field (SIG) transmission over multiple WLAN channels.

FIG. 3 shows an example of a pilot pattern 300 for SIG transmission over multiple WLAN channels. In some implementations, a SIG can be duplicated over multiple WLAN channels. FIG. 3 shows two 20 MHz WLAN channels: a primary channel 320, and a secondary channel 330. The two WLAN channels 320 and 330 are separated by a guard band or guard tones 305. Each WLAN channel includes a number of OFDM symbols 315. Each OFDM symbol includes multiple tones such as data tones 325 and pilot tone 335. The pilot tone 335 can be a regular pilot tone or an interference measurement pilot tone.

In the pilot pattern 300, the SIG 310 of the primary channel 320 occupies three OFDM symbols 315 in time domain, spanning all the frequency tones in frequency domain. In other words, in this particular example shown in FIG. 3, the SIG field 310 of the primary channel 320 includes all the blocks shown in FIG. 3 in the primary channel 320 and all gray blocks are pilot tones 315 belonging to this SIG field 310. The SIG 310 is duplicated over the secondary WLAN channel 330. The pilot tones 335 can be assigned with a regular type of pilot or an interference measurement type of pilot. The locations and the types of pilot tones 335 included in the SIG 310 form the pilot pattern 300.

The pilot pattern 300 can be obtained by selecting certain locations for the pilot tones 335 and assigning the types of pilot tones for each pilot location. The locations of pilot tones of a pilot pattern can be obtained, for example, according to a legacy design (e.g., an 802.11ax design) or other designs. The pilot pattern 300 shows that the pilot tones occupy the same tones in all three OFDM symbols 315 of the SIG 310. However, the pilot tones can be inserted in different tones of OFDM symbol 315, for example, to serve as time-varying pilot tones.

Various allocations or partitions of the regular pilot tones and interference measurement pilot tones can be used for a pilot pattern. Depending on the type of pilot tones, the pilot pattern 300 can be an interference measurement pilot pattern or a regular pilot pattern. An interference measurement pilot pattern can be obtained, for example, by joint or direct pilot insertion for two types of pilot tones, puncturing a regular pilot pattern, or other techniques.

Figure 4:
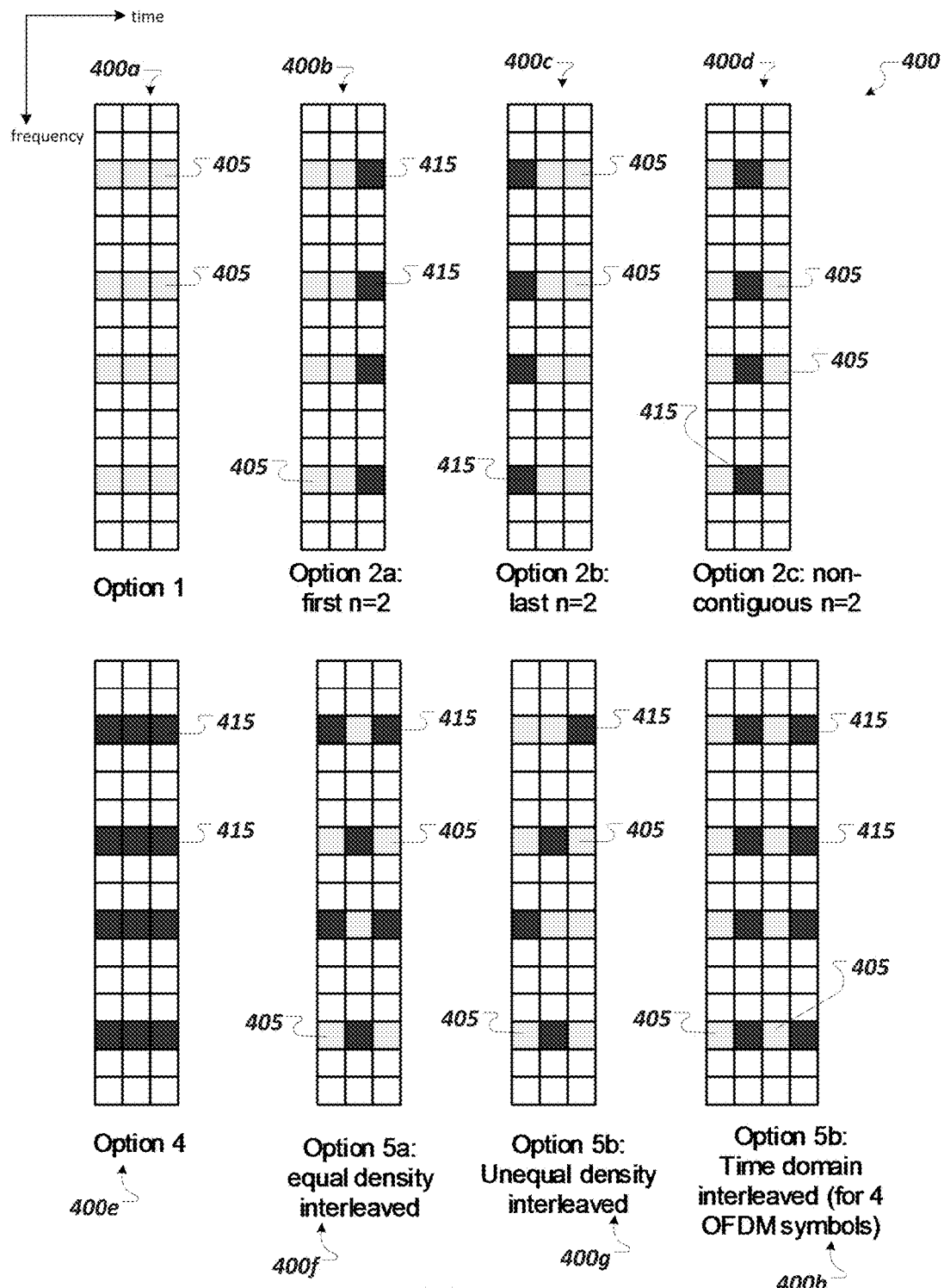
FIG. 4 shows multiple examples of pilot patterns for SIG transmission over a single WLAN channel.

FIG. 4 shows examples of pilot patterns 400a-h for SIG transmission over a single WLAN channel. For example, each of pilot patterns 400a-h can be the pilot pattern 300 in FIG. 3, transmitted over the primary channel 320 or secondary channel 330, or other suitable channels. The pilot patterns 400a-h share the same configurations as the pilot pattern 300 (i.e., the pilots occupying the same tones over three OFDM symbols). In general, a pilot pattern can have other pilot locations and configurations (e.g., in terms of number of OFDM symbols and WLAN channels). For example, a pilot pattern of an SIG can span N OFDM symbols in total. Throughout FIG. 4, a lighter check represents a regular pilot tone 405 while a darker check represents an interference measurement pilot tone 415. The pilot tones can occupy some or all or tones of an OFDM symbol.

Pilot pattern 400a is an example of a regular pilot pattern that includes only regular pilot tones 405 but no interference measurement pilot tones 415. The pilot pattern 400a can be a pilot pattern compatible with a legacy system.

Pilot patterns 400b-d are examples of a first type of interference measurement pilot pattern. The first type of interference measurement pilot pattern includes regular pilot tones 405 in n OFDM symbols (out of the N OFDM symbols of the pilot pattern) and interference measurement pilot tones 415 on the rest OFDM symbols. The n symbols for regular pilots can be either the first n symbols, the last n symbols, or other subsets of n symbols out of the N OFDM symbols of the pilot pattern. For example, the pilot pattern 400b includes regular pilot tones 405 in the first n=2 OFDM symbols and interference measurement pilot tones 415 on the third OFDM symbol. The pilot pattern 400c includes regular pilot tones 405 in the last n=2 OFDM symbols and interference measurement pilot tones 415 in the first OFDM symbol. The pilot pattern 400d includes regular pilot tones 405 in n=2 non-contiguous OFDM symbols and interference measurement pilot tones 415 on the OFDM symbol in between the n=2 OFDM symbols with regular pilot tones 405.

In some implementations, if the total number of OFDM symbols for SIG, N, is not larger than n, then no interference measurement pilot tones are present. The value of n can be fixed or varying. The value of n can be signaled per packet or signaled via some control or management frames between a transmitter and a receiver.

Similarly, a second type of pilot pattern (not shown) can include interference measurement pilot tones in m OFDM symbols and regular pilot tones on the remaining of the N OFDM symbols of the pilot pattern.

Pilot pattern 400e shows an example of a third type of interference measurement pilot pattern that includes only interference measurement pilot tones 415 without any regular pilot tones 405.

Pilot patterns 400f-h shows examples of a fourth type of interference measurement pilot pattern that includes interleaved regular pilot tones 405 and interference measurement pilot tones 415. The regular pilot tones 405 and interference measurement pilot tones 415 can be interleaved in the frequency domain, the time domain, or both. The regular pilot tones 405 and interference measurement pilot tones 415 can be interleaved with equal or unequal density. For example, the pilot pattern 400f shows the regular pilot tones 405 and interference measurement pilot tones 415 interleaved with an equal density, i.e., the number of the regular pilot tones 405 and the number of interference measurement pilot tones 415 are the same. The pilot pattern 400g shows the regular pilot tones 405 and interference measurement pilot tones 415 interleaved with an unequal density. Specifically, the pilot pattern 400g includes more regular pilot tones 405 than interference measurement pilot tones 415. Pilot pattern 400h shows the regular pilot tones 405 and interference measurement pilot tones 415 interleaved in the time-domain over N=4 OFDM symbols with equal density. Additional or different placement and partitions of the regular pilot tones 405 and interference measurement pilot tones 415 can be devised, and thus additional or different pilot patterns can configured.

FIG. 5 is a flowchart showing an example of a process 500 of implementing interference measurement pilot tones for transmission in a communication system. This process can be implemented by a wireless communication device such as the wireless communication device 200 in a communication system such as the system 100.

At 510, a pilot pattern is identified (e.g., by a transmitting device such as the wireless communication device 200) for transmission in a number of OFDM symbols (e.g., OFDM symbols 315) over a WLAN channel (e.g., WLAN channel 320, 330, or both). The pilot pattern can be an interference measurement pilot pattern (e.g., the pilot patterns 400b-h) that includes an interference measurement pilot tone (e.g., the interference measurement pilot tone 415). The interference measurement pilot tone is located at a specified frequency and time location in the number of OFDM symbols. The interference measurement pilot tone includes a null tone that facilitates a receiving device to measure interference. In some implementations, the pilot pattern further includes a regular, nonzero pilot tone (e.g., the regular pilot tone 405) that facilitates the receiving device to measure a frequency drift or a phase noise.

In some implementations, identifying the pilot pattern can include identifying respective frequency and time locations of the interference measurement pilot tone and the regular, nonzero pilot tone, and generating and placing the two types of pilot tones according to the identified locations. The locations of the interference measurement pilot tone and the regular, nonzero pilot tone can be determined, for example, according to specifications of one or more standards (e.g., 802.11ax or HEW) or protocols known by the transmitting device and receiving device.

In some implementations, pilot tone locations per 20 MHz depends on the definition of the full BW. For example, in an HE DL OFDMA PPDU, each 242-tone resource unit (with HE numerology) represents a 20 MHz in the data field, and the frequency positions of each 242-tone resource unit vary by the bandwidth. Pilot tone locations per 20 MHz (or per 242-tone resource unit) is defined based on the full BW. In another example, L-SIG and HE-SIGA/HE-SIGB are transmitted over multiple 20 MHz channels. In each 20 MHz channel, an individual non-HT/HT tone plan is applied, which leads to guard subcarriers between adjacent 20 MHz channels, while the data field occupies all subcarriers (except a few tone around DC, and some guard tones on both sides) using HE tone plan. The pilot tone location in SIGs and data fields can be different per tone plan.

In some implementations, the locations of the interference measurement pilot tone and the regular, nonzero pilot tone can be determined, for example, to improve or optimize measurement accuracy. For example, the locations of the pilot tones can be determined to capture frequency-varying interferences, time-varying interferences, or both (e.g., by using interference measurement pilot patterns such as patterns 400f-h with even or uneven density of the two types of pilot tones interleaved in the frequency domain, time domain, or both).

Figure 6:
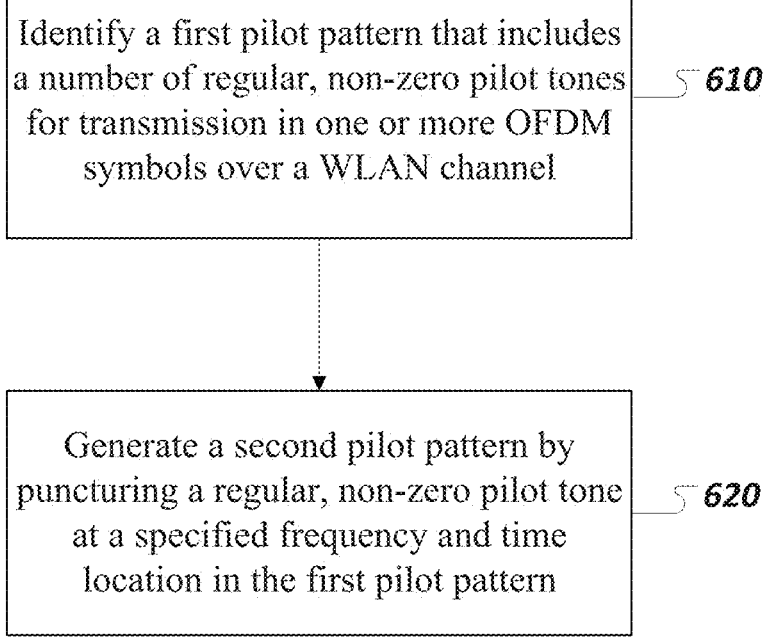
FIG. 6 is a flowchart showing an example of a process of identifying a pilot pattern that includes one or more interference measurement pilot tones.

In some implementations, identifying the pilot pattern can include generating the interference measurement pilot pattern by direct allocation of the interference measurement pilot tones, by puncturing a regular pilot pattern, for example, according the process described with respect to FIG. 6, or by additional or different techniques.

In some implementations, the pilot pattern includes only interference measurement pilot tones and no regular, nonzero pilot tones in the number of OFDM symbols, such as the pilot pattern 400e. In some implementations, the pilot pattern includes one or more interference measurement pilot tones in a first number of OFDM symbols out of the total number of OFDM symbols and one or more regular, nonzero pilot tones in remaining OFDM symbols of the total number of OFDM symbols, such as the pilot patterns 400b-d. In some implementations, the pilot pattern includes one or more interference measurement pilot tones and one or more regular, nonzero pilot tones interleaved in the number of OFDM symbols, such as the pilot patterns 400f-h. The pilot pattern includes additional or different configurations of the interference measurement pilot tones and the regular, nonzero pilot tones.

In some implementations, the pilot pattern can be a function of an identifier of the transmitting device or the receiving device to avoid collision of the interference measurement pilot tone with interference measurement pilot tones of other transmitting devices. In one example, the subcarriers that carry pilot tones are shifted by the remainder of the transmitting STA ID by 6. In another example, the subcarriers are shifted by a hushed value of the transmitting STA ID. Identifying the pilot pattern at 510 can include receiving an identifier of the transmitting device or the receiving device and determining the corresponding pilot pattern based on the function of the identifier. For example, pilot patterns can be varied for different basic service set (BSS) or STA so that the interference measurement pilot tone will not collide across neighboring BSSs to ensure that the respective receiving device can obtain reliable interference measurement. For example, different transmitters can have different null tone locations. As such, when a receiver receives two incoming packets from two transmitters, at the null tone location of the desired transmitter, it can hear the interference of the interfering transmitter, since the interfering transmitter transmits data on the desired transmitter's null tones. In some implementations, the pilot pattern can be a function of BSS/STA ID (e.g., BSS coloring or STA address) or another identifier or attribute of the transmitting device or the receiving device.

In some implementations, the pilot pattern can be a function of a location of an allocated wireless channel resource of the receiving device relative to a boundary of the WLAN channel. In one example, the subcarriers that carry pilot tones are shifted by the remainder of a received signal strength indicator (RSSI) value in dB by 6. In another example, the subcarriers is shifted by a hushed value of the RSSI value in dB. Identifying the pilot pattern at 510 can include identifying the location of the allocated wireless channel resource of the receiving device relative to the boundary of the WLAN channel and determining the corresponding pilot pattern based on the function of the allocated wireless channel resource of the receiving device relative to the boundary of the WLAN channel. For example, the transmitting device can serve as an AP (e.g., the wireless communication device 110) that provides network services to multiple receiving devices that function as STAs (e.g., the wireless communication device 120, 130, and 140). The transmitting device can schedule or otherwise allocate wireless channel resources (e.g., frequency tones or bands, time slots or OFDM symbols, or in terms of other granularities) to multiple receiving devices.

For example, the receiving device can be a first receiving device and the pilot pattern can be a first pilot pattern. The transmitting device can allocate a first wireless channel resource to the first receiving device. The first wireless channel resource can be adjacent to or on a boundary of the WLAN channel. The transmitting device can allocate a second wireless channel resource to a second receiving device. The second wireless channel resource can be away from the boundary of the WLAN channel (e.g., located in the middle of the WLAN channel). The transmitting device can identify a second pilot pattern for the second receiving device for transmission in the number of OFDM symbols over the WLAN channel. In some instances, the first pilot pattern can include more interference measurement pilot tones than the second pilot pattern. The transmitting device can transmit the second pilot pattern in the number of OFDM symbols over the WLAN channel. As an example, the pilot patterns 400f-h can be selected as the first pilot pattern that is assigned to the first receiving device (e.g., an STA) with a scheduled wireless channel resource adjacent or on the boundary of a WLAN channel (which may be subject to more interferences), while the pilot patterns 400a can be selected as the second pilot pattern that is assigned to the second receiving device with a scheduled wireless channel resource in the middle or otherwise away from the boundary of the WLAN channel (which may be subject to fewer interferences).

At 520, a power of an OFDM symbol that includes the interference measurement pilot tone can be adjusted, for example, by the transmitting device (e.g., the wireless communication device 200). When the interference measurement pilot tone is present in an OFDM symbol, the power of that OFDM symbol can be boosted or adjusted accordingly, for example, to keep a same average power per OFDM symbol or a same average power per tone across the number of OFDM symbols in the WLAN channel. The use of the interference measurement pilot tone can in turn boost the power of the regular pilot tones, data tones, or both, achieve more efficient use of the transmission power, and reduce the error rate of the corresponding received signal.

At 530, the pilot pattern is transmitted by the transmitting device (e.g., by the transceiver electronics 215 of the wireless communication device 200) in the number of OFDM symbols over the WLAN channel. In some implementations, the pilot pattern is transmitted in one or more signal fields (SIGs) of the number of OFDM symbols.

In some implementations, more than one pilot pattern can be transmitted over more than one WLAN channel. For instance, for wideband (WB) SIG encoding or data field implementations where SIG fields are encoded over all the WLAN channels (with or without repetition) or the data field is over 20 MHz, the same or different pilot pattern can be applied to each WLAN channel.

For example, the WLAN channel can be a first WLAN channel and the pilot pattern can be a first pilot pattern. The transmitting device can identify a third pilot pattern for transmission in a second number of OFDM symbols over a second WLAN channel. The transmitting device can then transmit the third pilot pattern in the second number of OFDM symbols over the second WLAN channel. The third pilot pattern can be the same as or different from the first pilot pattern. For example, the third pilot pattern can be a regular pilot pattern that includes only interference measurement pilot tones but no regular, nonzero pilot tones. In some implementations, the second WLAN channel can be a primary channel and the first WLAN channel can be a secondary channel for the transmitting device. As such, the first pilot pattern can include more interference measurement pilot tones than the third pilot pattern. For instance, the primary channel can use a regular pilot pattern 400a as the third pilot pattern for CFO drift or phase noise estimation, while the secondary channel can use one of the interference measurement pilot patterns 400b-h as the first pilot pattern. In some implementations, more than one secondary channel can be used, and each secondary channel can have its respective pilot pattern.

The pilot patterns can be fixed or varying over time for each of the transmitting device or the receiving device per WLAN channel. The pilot pattern or an identifier of the pilot pattern can be signaled via control or management frames, other portion of SIG fields (e.g., SIG-segment-0, reserved bits in L-SIG, or other fields), or via a dedicated signal between the transmitting device and the receiving device.

FIG. 6 is a flowchart showing an example of a process 600 of identifying a pilot pattern that includes one or more interference measurement pilot tones. This process can be implemented by a wireless communication device (e.g., the example wireless communication device 200) in a communication system (e.g., the system 100). This process can be an example of a process for the operation 510 of the process 500.

At 610, a first pilot pattern is identified, for example, by a processor of a device (e.g., processor electronics 210 of the wireless communication device 200), for transmission in a number of OFDM symbols over a WLAN channel. The first pilot pattern includes a number of regular, non-zero pilot tones. For example, the first pilot pattern can be a regular pilot pattern (e.g., pilot pattern 400a) that includes only regular, non-zero pilot tones but without any interference measurement pilot tones. In some implementations, the first pattern can be an interference measurement pilot pattern that already includes interference measurement pilot tones.

At 620, a second pilot pattern is generated by puncturing a regular, non-zero pilot tone at a specified frequency and time location in the first pilot pattern, for example, by the processor of the device (e.g., the processor electronics 210 of the wireless communication device 200). Puncturing a regular, non-zero pilot tone can include masking or replacing the regular, non-zero pilot tone with a null tone, or otherwise leaving the specified frequency and time location of the regular, non-zero pilot tone unused or blank. As a result, the regular, non-zero pilot tone is transformed into an interference measurement pilot tone, and the second pilot pattern becomes an interference measurement pilot pattern that includes more interference measurement pilot tones than the first pilot pattern.

In some implementations, more than one regular, non-zero pilot tone of the first pilot pattern can be punctured to generate the second pilot pattern. In some implementations, the second pilot pattern can be equivalent to an interference measurement pilot pattern that is generated by direct allocation of the interference measurement pilot tones according to the techniques described with respect to FIGS. 4 and 5.

Further aspects of the present invention relate to one or more of the following clauses. A method includes identifying, by a transmitting device, a pilot pattern for transmission in a plurality of orthogonal frequency-division multiplexing (OFDM) symbols over a wireless local area network (WLAN) channel, the pilot pattern including an interference measurement pilot tone, wherein the interference measurement pilot tone is located at a specified frequency and time location in the plurality of OFDM symbols, the interference measurement pilot tone including a null tone that facilitates a receiving device to measure interference; and transmitting, by the transmitting device, the pilot pattern in the plurality of OFDM symbols over the WLAN channel.

In some implementations, the pilot pattern further includes a regular, nonzero pilot tone that facilitates the receiving device to measure a frequency drift or a phase noise. In some implementations, the pilot pattern is transmitted in one or more signal fields (SIGs) of the plurality of OFDM symbols.

In some implementations, the method further includes adjusting, by the transmitting device, a power of an OFDM symbol that includes the interference measurement pilot tone to keep a same average power per OFDM symbol or a same average power per tone across the plurality of OFDM symbols.

In some implementations, the pilot pattern includes only interference measurement pilot tones and no regular, non-zero pilot tones in the plurality of OFDM symbols; or one or more interference measurement pilot tones in a first number of OFDM symbols out of the plurality of OFDM symbols and one or more regular, nonzero pilot tones in remaining OFDM symbols of the plurality of OFDM symbols; or one or more interference measurement pilot tones and one or more regular, nonzero pilot tones interleaved in the plurality of OFDM symbols.

In some implementations, the pilot pattern is a function of an identifier of the transmitting device or the receiving device, and wherein the function prevents collision of the interference measurement pilot tone with interference measurement pilot tones of other transmitting devices. In some implementations, the pilot pattern is a function of a location of an allocated wireless channel resource of the receiving device relative to a boundary of the WLAN channel.

In some implementations, the receiving device is a first receiving device and the pilot pattern is a first pilot pattern, the method further including allocating, by the transmitting device, a first wireless channel resource to the first receiving device, wherein the first wireless channel resource is adjacent to or on a boundary of the WLAN channel; allocating, by the transmitting device, a second wireless channel resource to a second receiving device, wherein the second wireless channel resource is away from the boundary of the WLAN channel; identifying, by the transmitting device, a second pilot pattern for the second receiving device for transmission in the plurality of OFDM symbols over the WLAN channel, wherein the first pilot pattern includes more interference measurement pilot tones than the second pilot pattern; and transmitting, by the transmitting device, the second pilot pattern in the plurality of OFDM symbols over the WLAN channel.

In some implementations, the WLAN channel is a first WLAN channel and the pilot pattern is a first pilot pattern, the method further including identifying, by the transmitting device, a second pilot pattern for transmission in a second plurality of OFDM symbols over a second WLAN channel; and transmitting, by the transmitting device, the second pilot pattern in the second plurality of OFDM symbols over the second WLAN channel. In some implementations, the second WLAN channel is a primary channel and the first WLAN channel is a secondary channel; and the first pilot pattern includes more interference measurement pilot tones than the second pilot pattern.

A device includes processor electronics configured to identify a first pilot pattern for transmission in a plurality of orthogonal frequency-division multiplexing (OFDM) symbols over a wireless local area network (WLAN) channel, the first pilot pattern including a plurality of regular, nonzero pilot tones; and generate a second pilot pattern including an interference measurement pilot tone by puncturing a regular, non-zero pilot tone at a specified frequency and time location in the first pilot pattern, the interference measurement pilot tone facilitating a receiving device to measure interference; and a transmitter configured to transmit the second pilot pattern in the plurality of OFDM symbols over the WLAN channel.

In some implementations, the processor electronics include a processor programmed with computer-readable instructions that, when run, cause the device to adjust a power of an OFDM symbol that includes the interference measurement pilot tone to keep a same average power per OFDM symbol or a same average power per tone across the plurality of OFDM symbols.

In some implementations, the second pilot pattern includes only interference measurement pilot tones and no regular, nonzero pilot tones in the plurality of OFDM symbols; or one or more interference measurement pilot tones in a first number of OFDM symbols out of the plurality of OFDM symbols and one or more regular, nonzero pilot tones in remaining OFDM symbols of the plurality of OFDM symbols; or one or more interference measurement pilot tones and one or more regular, nonzero pilot tones interleaved in the plurality of OFDM symbols.

In some implementations, the second pilot pattern is a function of an identifier of the transmitting device or the receiving device, and wherein the function prevents collision of the interference measurement pilot tone with interference measurement pilot tones of other transmitting devices. In some implementations, the second pilot pattern is a function of a location of an allocated wireless channel resource of the receiving device relative to a boundary of the WLAN channel.

A non-transitory computer-readable medium embodying a program operable to cause a transmitting device to perform operations include identifying a pilot pattern for transmission in a plurality of orthogonal frequency-division multiplexing (OFDM) symbols over a wireless local area network (WLAN) channel, the pilot pattern including an interference measurement pilot tone, wherein the interference measurement pilot tone is located at a specified frequency and time location in the plurality of OFDM symbols, the interference measurement pilot tone including a null tone that facilitates a receiving device to measure interference; and transmitting the pilot pattern in the plurality of OFDM symbols over the WLAN channel.

In some implementations, the pilot pattern is a function of an identifier of the transmitting device or the receiving device, and wherein the function prevents collision of the interference measurement pilot tone with interference measurement pilot tones of other transmitting devices.

In some implementations, the receiving device is a first receiving device and the pilot pattern is a first pilot pattern, the operations further including allocating a first wireless channel resource to the first receiving device, wherein the first wireless channel resource is adjacent to or on a boundary of the WLAN channel; allocating a second wireless channel resource to a second receiving device, wherein the second wireless channel resource is away from the boundary of the WLAN channel; identifying a second pilot pattern for the second receiving device for transmission in the plurality of OFDM symbols over the WLAN channel, wherein the first pilot pattern includes more interference measurement pilot tones than the second pilot pattern; and transmitting the second pilot pattern in the plurality of OFDM symbols over the WLAN channel.

In some implementations, the WLAN channel is a first WLAN channel and the pilot pattern is a first pilot pattern, the operations further including identifying, by the transmitting device, a second pilot pattern for transmission in a second plurality of OFDM symbols over a second WLAN channel; and transmitting, by the transmitting device, the second pilot pattern in the second plurality of OFDM symbols over the second WLAN channel. In some implementations, the second WLAN channel is a primary channel and the first WLAN channel is a secondary channel; and the first pilot pattern includes more interference measurement pilot tones than the second pilot pattern.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
   identifying, by a transmitting device, a pilot pattern for transmission in a plurality of orthogonal frequency-division multiplexing (OFDM) symbols over a wireless local area network (WLAN) channel, the pilot pattern comprising an interference measurement pilot tone, wherein the interference measurement pilot tone is located at a specified frequency and time location in the plurality of OFDM symbols, the interference measurement pilot tone comprising a null tone that facilitates a receiving device to measure interference, wherein the receiving device is a first receiving device and the pilot pattern is a first pilot pattern;
   allocating, by the transmitting device, a first wireless channel resource to the first receiving device, wherein the first wireless channel resource is adjacent to or on a frequency boundary of the WLAN channel;
   allocating, by the transmitting device, a second wireless channel resource to a second receiving device, wherein the second wireless channel resource is away from the frequency boundary of the WLAN channel;
   identifying, by the transmitting device, a second pilot pattern for the second receiving device for transmission in the plurality of OFDM symbols over the WLAN channel, wherein the first pilot pattern includes more interference measurement pilot tones than the second pilot pattern;
   transmitting, by the transmitting device, the first pilot pattern in the plurality of OFDM symbols over the WLAN channel; and transmitting, by the transmitting device, the second pilot pattern in the plurality of OFDM symbols over the WLAN channel.

2. The method of claim 1, wherein the first pilot pattern further includes a regular, nonzero pilot tone that facilitates the receiving device to measure a frequency drift or a phase noise.

3. The method of claim 1, wherein the first pilot pattern is transmitted in one or more signal fields (SIGs) of the plurality of OFDM symbols.

4. The method of claim 1, further comprising adjusting, by the transmitting device, a power of an OFDM symbol that includes the interference measurement pilot tone to keep a same average power per OFDM symbol or a same average power per tone across the plurality of OFDM symbols.

5. The method of claim 1, wherein the first pilot pattern comprises:
 only interference measurement pilot tones and no regular, nonzero pilot tones in the plurality of OFDM symbols; or
 one or more interference measurement pilot tones in a first number of OFDM symbols out of the plurality of OFDM symbols and one or more regular, nonzero pilot tones in remaining OFDM symbols of the plurality of OFDM symbols; or
 one or more interference measurement pilot tones and one or more regular, nonzero pilot tones interleaved in the plurality of OFDM symbols.

6. The method of claim 1, wherein the first pilot pattern is a function of an identifier of the transmitting device or the receiving device, and wherein the function prevents collision of the interference measurement pilot tone with interference measurement pilot tones of other transmitting devices.

7. The method of claim 1, wherein the first pilot pattern is a function of a location of an allocated wireless channel resource of the receiving device relative to a frequency boundary of the WLAN channel.

8. The method of claim 1, wherein the WLAN channel is a first WLAN channel, the method further comprising:
 identifying, by the transmitting device, a third pilot pattern for transmission in a second plurality of OFDM symbols over a second WLAN channel; and
 transmitting, by the transmitting device, the third pilot pattern in the second plurality of OFDM symbols over the second WLAN channel.

9. The method of claim 8, wherein:
 the second WLAN channel is a primary channel and the first WLAN channel is a secondary channel; and
 the first pilot pattern includes more interference measurement pilot tones than the third pilot pattern.

10. A device comprising:
 processor electronics configured to:
  identify a first pilot pattern for transmission in a plurality of orthogonal frequency-division multiplexing (OFDM) symbols over a wireless local area network (WLAN) channel, the first pilot pattern comprising a plurality of regular, non-zero pilot tones;
  generate a second pilot pattern comprising an interference measurement pilot tone by puncturing a regular, non-zero pilot tone at a specified frequency and time location in the first pilot pattern, the interference measurement pilot tone facilitating a receiving device to measure interference, wherein the receiving device is a first receiving device;
  allocate a first wireless channel resource to the first receiving device, wherein the first wireless channel resource is adjacent to or on a frequency boundary of the WLAN channel;
  allocate a second wireless channel resource to a second receiving device, wherein the second wireless channel resource is away from the frequency boundary of the WLAN channel; and
  identify a third pilot pattern for the second receiving device for transmission in the plurality of OFDM symbols over the WLAN channel, wherein the second pilot pattern includes more interference measurement pilot tones than the third pilot pattern; and
 a transmitter configured to:
  transmit the second pilot pattern in the plurality of OFDM symbols over the WLAN channel; and
  transmit the third pilot pattern in the plurality of OFDM symbols over the WLAN channel.

11. The device of claim 10, wherein the processor electronics comprise a processor programmed with computer-readable instructions that, when run, cause the device to adjust a power of an OFDM symbol that includes the interference measurement pilot tone to keep a same average power per OFDM symbol or a same average power per tone across the plurality of OFDM symbols.

12. The device of claim 10, wherein the second pilot pattern comprises:
 only interference measurement pilot tones and no regular, nonzero pilot tones in the plurality of OFDM symbols; or
 one or more interference measurement pilot tones in a first number of OFDM symbols out of the plurality of OFDM symbols and one or more regular, nonzero pilot tones in remaining OFDM symbols of the plurality of OFDM symbols; or
 one or more interference measurement pilot tones and one or more regular, nonzero pilot tones interleaved in the plurality of OFDM symbols.

13. The device of claim 10, wherein the second pilot pattern is a function of an identifier of the transmitter or the receiving device, and wherein the function prevents collision of the interference measurement pilot tone with interference measurement pilot tones of other transmitting devices.

14. The device of claim 10, wherein the second pilot pattern is a function of a location of an allocated wireless channel resource of the receiving device relative to a frequency boundary of the WLAN channel.

15. A non-transitory computer-readable medium embodying a program operable to cause a transmitting device to perform operations comprising:
 identifying a pilot pattern for transmission in a plurality of orthogonal frequency-division multiplexing (OFDM) symbols over a wireless local area network (WLAN) channel, the pilot pattern comprising an interference measurement pilot tone, wherein the interference measurement pilot tone is located at a specified frequency and time location in the plurality of OFDM symbols, the interference measurement pilot tone comprising a null tone that facilitates a receiving device to measure interference, wherein the receiving device is a first receiving device and the pilot pattern is a first pilot pattern;
 allocating a first wireless channel resource to the first receiving device, wherein the first wireless channel resource is adjacent to or on a frequency boundary of the WLAN channel;

allocating a second wireless channel resource to a second receiving device, wherein the second wireless channel resource is away from the frequency boundary of the WLAN channel;
identifying a second pilot pattern for the second receiving device for transmission in the plurality of OFDM symbols over the WLAN channel, wherein the first pilot pattern includes more interference measurement pilot tones than the second pilot pattern;
transmitting the first pilot pattern in the plurality of OFDM symbols over the WLAN channel; and
transmitting the second pilot pattern in the plurality of OFDM symbols over the WLAN channel.

16. The medium of claim 15, wherein the first pilot pattern is a function of an identifier of the transmitting device or the receiving device, and wherein the function prevents collision of the interference measurement pilot tone with interference measurement pilot tones of other transmitting devices.

17. The medium of claim 15, wherein the WLAN channel is a first WLAN channel, the operations further comprising:
identifying, by the transmitting device, a third pilot pattern for transmission in a second plurality of OFDM symbols over a second WLAN channel; and
transmitting, by the transmitting device, the third pilot pattern in the second plurality of OFDM symbols over the second WLAN channel.

18. The medium of claim 17, wherein:
the second WLAN channel is a primary channel and the first WLAN channel is a secondary channel; and
the first pilot pattern includes more interference measurement pilot tones than the third pilot pattern.

\* \* \* \* \*